(12) United States Patent
Geckler et al.

(10) Patent No.: US 9,194,307 B2
(45) Date of Patent: Nov. 24, 2015

(54) MULTI-FUEL FLOW SYSTEMS AND METHODS WITH DEDICATED EXHAUST GAS RECIRCULATION

(71) Applicant: Cummins Inc., Columbus, IN (US)

(72) Inventors: Samuel C. Geckler, Columbus, IN (US); Marten H. Dane, Columbus, IN (US); Anthony Kyle Perfetto, Columbus, IN (US)

(73) Assignee: Cummins Inc., Columbus, IN (US)

( * ) Notice: Subject to any disclaimer, the term of this patent is extended or adjusted under 35 U.S.C. 154(b) by 415 days.

(21) Appl. No.: 13/834,632

(22) Filed: Mar. 15, 2013

(65) Prior Publication Data

US 2014/0261322 A1    Sep. 18, 2014

(51) Int. Cl.
| | |
|---|---|
| *F02D 19/06* | (2006.01) |
| *F02D 41/00* | (2006.01) |
| *F02M 25/07* | (2006.01) |
| *F02D 19/08* | (2006.01) |

(52) U.S. Cl.
CPC ............ *F02D 19/061* (2013.01); *F02D 41/008* (2013.01); *F02D 41/0025* (2013.01); *F02D 41/0065* (2013.01); *F02M 25/0707* (2013.01); *F02M 25/0731* (2013.01); *F02M 25/0749* (2013.01); *F02D 19/0647* (2013.01); *F02D 19/0692* (2013.01); *F02D 19/084* (2013.01); *Y02T 10/36* (2013.01); *Y02T 10/47* (2013.01)

(58) Field of Classification Search
CPC .......... F02M 25/0703; F02M 25/0707; F02M 25/0749; F02M 25/07; F02D 41/0007; F02D 23/00; F02D 19/061; F02D 41/008; F02D 41/0025; F02D 41/0065

USPC ............... 123/445, 568.11–568.32, 304, 305, 123/315, 299; 701/103, 104, 108; 60/601, 60/605.2, 278, 286, 303
See application file for complete search history.

(56) References Cited

U.S. PATENT DOCUMENTS

| | | | |
|---|---|---|---|
| 6,543,230 B1 * | 4/2003 | Schmid ....................... 60/605.2 |
| 7,409,926 B2 | 8/2008 | Sun et al. |
| 8,027,777 B2 | 9/2011 | Ichihara et al. |
| 8,291,891 B2 * | 10/2012 | Alger et al. ............. 123/568.11 |
| 2004/0139944 A1 | 7/2004 | Nakano et al. |

(Continued)

FOREIGN PATENT DOCUMENTS

| | | |
|---|---|---|
| WO | WO 0111217 A1 * | 2/2001 |
| WO | WO 2014005127 A2 * | 1/2014 |

OTHER PUBLICATIONS

International Searching Authority, Notification of Transmittal of The International Search Report and the Written Opinion of The International Searching Authority, or the Declaration, Jul. 17, 2014, 15 pages.

*Primary Examiner* — Stephen K Cronin
*Assistant Examiner* — Xiao Mo
(74) *Attorney, Agent, or Firm* — Taft, Stettinius & Hollister LLP

(57) ABSTRACT

Systems and methods for fuelling a plurality of cylinders of an internal combustion engine are disclosed. The system includes a dedicated exhaust gas recirculation system for recirculating exhaust gas flow from at least one dedicated cylinder of an engine into an intake system prior to combustion. The system further includes a fueling system to provide a first flow of fuel to each of the plurality of cylinders and a second flow of fuel to each of the dedicated cylinders that is in addition to the first flow of fuel.

40 Claims, 7 Drawing Sheets

(56) References Cited

U.S. PATENT DOCUMENTS

2009/0308070 A1* 12/2009 Alger et al. ............... 60/602
2012/0048244 A1   3/2012 Hayman et al.
2012/0095668 A1   4/2012 Landsmann et al.
2012/0204844 A1   8/2012 Gingrich et al.
2012/0285426 A1  11/2012 Hayman et al.
2014/0360461 A1* 12/2014 Ulrey et al. ............... 123/299

* cited by examiner

MULTI-FUEL FLOW SYSTEMS AND METHODS WITH DEDICATED EXHAUST GAS RECIRCULATION

FIELD OF THE INVENTION

The present invention relates generally to exhaust gas recirculation in internal combustion engines, and more particularly is concerned with systems and methods for exhaust gas recirculation from one or more dedicated cylinders that receive multiple fuel flows.

BACKGROUND

The production of noxious nitrogen oxides ($NO_x$) by internal combustion engines which pollute the atmosphere are undesirable and in many cases are controlled by regulations established by governmental entities. Furthermore, spark ignited engines exhibit abnormal combustion phenomena called "knock", which occurs when combustion reactions in the unburned zone initiate rapid uncontrolled combustion prior to the arrival of the propagating flame front of a homogenous combustion process. One method for controlling knock includes increasing the flame propagation rate by, for example, improving the mixture homogeneity or by increasing the turbulence level induced by organized charge motion.

One technique for limiting or controlling the combustion temperature of the engine and thus reduce $NO_x$ emissions has been to recirculate a portion of the exhaust gas back to the engine air intake to lower the oxygen content in the intake air. This reduces the combustion temperature of the intake charge and in turn reduces the amount of $NO_x$ formation during combustion due to lower flame temperatures. In order to recirculate exhaust gas, an exhaust gas recirculation (EGR) line that connects the exhaust manifold to the intake air supply line is provided.

A technique to increase the flame propagation rate to address knock is to have one or more cylinders dedicated to providing EGR flow to the engine intake. When the EGR line is connected with one or more dedicated cylinders, the engine acts as a positive displacement pump to drive the EGR flow, eliminating pumping losses in transporting exhaust to the intake system and allowing a wide range of engine out nitrous oxide emissions to be achieved. Also, since the exhaust from the dedicated cylinder does not escape the engine, it is possible to have alternative combustion processes with the dedicated cylinder(s). In addition, a variable geometry turbocharger is not required to drive EGR flow, facilitating meeting of target air-fuel ratios.

Engines operating with one or more cylinders as dedicated EGR cylinders enjoy greatly simplified controls and pressure management, fewer hardware devices, and other benefits. However, while there is some ability to control the combustion processes such as by running the dedicated EGR cylinder(s) to generate favorable species like hydrogen, the ability to do so is limited since the same fuel is used in the dedicated and non-dedicated cylinders. For example, certain fuels provide high energy density but do not readily produce favorable species such as hydrogen and carbon monoxide, which increase combustion speed, reduce engine knock, and improve fuel economy. Other fuels more readily produced favorable species, but sacrifice energy density and performance.

Thus, there remains a need for additional improvements in systems and methods that include one or more dedicated cylinders dedicated to providing EGR flow to optimize operation, performance, and fuel economy of internal combustion engines.

SUMMARY

Embodiments include unique systems and methods for an engine having a plurality of cylinders and a dedicated exhaust gas recirculation system. The dedicated exhaust gas recirculation system recirculates exhaust gas flow from at least one dedicated cylinder of the engine into an air intake system prior to combustion. The systems and methods further include a fuel system that provides a first fuel flow to the plurality of cylinders and a second fuel flow to the dedicated cylinder(s). The first fuel flow to the plurality of cylinders is controlled to provide an exhaust lambda value of about 1 from the non-dedicated cylinders while the second fuel flow to the dedicated cylinder(s) is controlled to provide an exhaust output having desired characteristics for recirculation to the plurality of cylinders with the intake air flow. Further embodiments, forms, objects, features, advantages, aspects, and benefits shall become apparent from the following description and drawings.

DESCRIPTION OF ILLUSTRATIVE EMBODIMENTS

Figure 1:
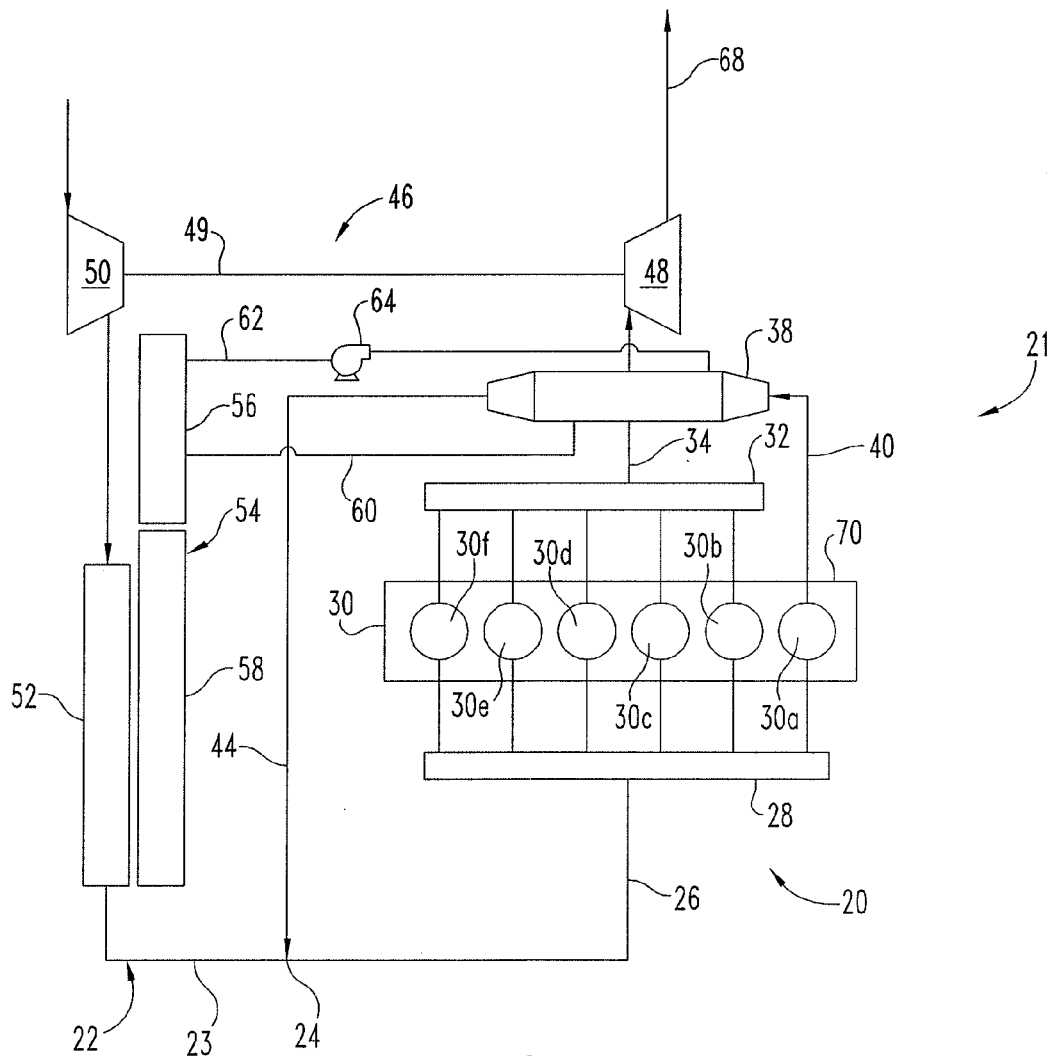
FIG. 1 is a schematic illustration of an internal combustion engine system that is configured to provide dedicated EGR flow from one or more dedicated cylinders and exhaust outlet flow from one or more non-dedicated cylinders.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1, a system 20 for providing a dedicated EGR flow is illustrated in schematic form. System 20 is depicted having an engine 30 with an intake and exhaust system connected by a dedicated EGR system or loop 21. The engine 30 is an internal combustion engine of any type, and can include a stoichiometric engine, a gasoline engine, alcohol engine (e.g. ethanol or methanol), or a natural gas engine. In certain embodiments, the engine 30 includes a lean combustion engine such as a lean burn gasoline engine, lean burn alcohol engine, lean burn natural gas engine, or a diesel cycle engine. In certain embodiments, the engine 30 may be any engine type producing emissions that may be used in an exhaust gas recirculation (EGR) system to, for example to reduce knock and $NO_x$ emissions from the engine 30. In the illustrated embodiment, the engine 30 includes six cylinders 30a-30f in an in-line arrangement. However, the number of cylinders may be any number, and the arrangement of cylinders may be any arrangement, and is not limited to the number and arrangement shown in FIG. 1.

The engine 30 includes at least one dedicated EGR cylinder 30a, and the remaining cylinders 30b-30f are not dedicated to EGR. However, cylinders 30b-30f may be connected to the intake system to provide exhaust gas recirculation in certain conditions. While only one dedicated EGR cylinder 30a is shown in FIG. 1, two or more dedicated EGR cylinders are also contemplated. The term dedicated EGR, as utilized herein, should be read broadly. Any EGR arrangement wherein, during at least certain operating conditions, the entire exhaust output of certain dedicated cylinder(s) is recirculated to the engine intake is a dedicated EGR arrangement. In the system 20, the exhaust gas from the dedicated cylinder(s) 30a recirculates and combines with intake gases at a position upstream of an intake manifold 28 of engine 30. The recirculated exhaust gas may combine with the intake gases at a mixer (not shown) at mixing location 24 of intake 22 or by any other arrangement. In certain embodiments, the recirculated exhaust gas returns to the intake manifold 28 directly. The dedicated EGR system 21 of FIG. 1 may be a high-pressure loop or system, for example, by returning the exhaust of the dedicated EGR cylinder(s) 30a to the intake 22 at a position downstream of a compressor 50 as shown, or a low-pressure loop, for example, by returning to the intake 22 at a position upstream of compressor 50.

Engine 30 includes an engine block 70 that at least partially defines the cylinders 30a-30f. A piston (not shown) may be slidably disposed within each cylinder 30a-30f to reciprocate between a top-dead-center position and a bottom-dead-center position, and a cylinder head (not shown) may be associated with each cylinder 30a-30f. Each of the cylinders 30a-30f, its respective piston, and the cylinder head form a combustion chamber. In the illustrated embodiment, engine 30 includes six such combustion chambers. However, it is contemplated that engine 30 may include a greater or lesser number of cylinders and combustion chambers and that cylinders and combustion chambers may be disposed in an "in-line" configuration, a "V" configuration, or in any other suitable configuration.

System 20 also includes an intake 22 that may include one or more inlet supply conduits 23, a mixing location 24, an intake manifold supply conduit 26, and an engine intake manifold 28 connected to engine 30. System 20 also includes an exhaust system coupled to engine 30 that includes an engine exhaust manifold 32, exhaust conduit 34, a turbocharger 46, and an aftertreatment system (not shown) connected with an outlet conduit 68 that includes, for example, a three-way catalyst for removing one or more pollutants from the exhaust gas stream.

In one embodiment, engine 30 is a four stroke engine. That is, for each complete engine cycle (i.e., for every two full crankshaft rotations), each piston of each cylinder 30a-30f moves through an intake stroke, a compression stroke, a combustion or power stroke, and an exhaust stroke. Thus, during each complete cycle for the depicted six cylinder engine, there are six strokes during which air is drawn into individual combustion chambers from intake manifold supply conduit 26. In the illustrated embodiment, during five strokes exhaust is expelled from individual cylinders 30b-30f to exhaust conduit 34, and during one exhaust stroke exhaust gas is expelled from cylinder 30a to a recirculating exhaust gas supply conduit 40 to provide a dedicated EGR fraction of about 16%. These strokes correspond with pulsations of air and exhaust within the respective systems. It should be understood that other dedicated EGR fractions are contemplated. For example, by way of illustration and not limitation, an arrangement with two dedicated EGR cylinders provides a dedicated EGR fraction of 33%, and a four cylinder engine with a single dedicated cylinder provides a dedicated EGR fraction of 25%.

Dedicated EGR system 21 includes a recirculating exhaust gas supply conduit 40 that is separate from exhaust flow conduit 34. Supply conduit 40 extends from and is in flow communication with the combustion chamber(s) of the dedicated cylinder(s) 30a of engine 30 that supplies exhaust gas flow to supply conduit 40. The dedicated EGR system 21 may also include an EGR cooler 38. EGR flow in dedicated EGR system 21 continues from EGR cooler 38 through an EGR conduit 44 to mixing location 24 where EGR flow is mixed with inlet flow from inlet supply conduit 23. EGR conduit 44 is flow coupled to mixing location 24 and the inlet supply conduit 23 is flow coupled to mixing location 24 to create a charge flow that includes combined inlet flow and recirculated exhaust gas from dedicated EGR system 21. The charge flow created at mixing location 24 is flow coupled to engine intake manifold 28 through intake manifold supply conduit 26.

The dedicated EGR cylinder(s) 30a of engine 30 is flow coupled to EGR cooler 38 through recirculating exhaust gas supply conduit 40, and EGR cooler 38 is flow coupled to mixing location 24 through EGR conduit 44. EGR cooler 38 may further be connected to a radiator system 54 including a low temperature radiator 56 and a high temperature radiator 58. A coolant return line 60 extends from EGR cooler 38 to radiator system 54 and a coolant supply line 62 supplies coolant from radiator system 54 to EGR cooler 38. Coolant supply line 62 may include a pump 64 to provide circulation of coolant flow. In another embodiment, the coolant system may utilize only one radiator, such as radiator 58. In still other embodiments, dedicated EGR system 21 includes a bypass and a control valve to selectively bypass all or a portion of the dedicated EGR flow around EGR cooler 38.

In one embodiment, exhaust conduit 34 is flowed coupled to exhaust manifold 32, and may also include one or more intermediate flow passages, conduits or other structures. Exhaust conduit 34 extends to a turbine 48 of a turbocharger 46. Turbocharger 46 may be any suitable turbocharger known in the art, including variable-geometry turbine turbochargers and waste-gated turbochargers. Turbocharger 46 may also include multiple turbochargers. Turbine 48 is connected via a shaft 49 to a compressor 50 flow coupled to inlet supply conduit 23. Inlet supply conduit 32 may include a charge air cooler 52 downstream from compressor 50 and upstream from mixing location 24. In another embodiment, a charge air cooler 52 is located in the intake system downstream from mixing location 24.

In operation of system 20, fresh air is supplied through inlet air supply conduit 23. The fresh air flow or combined flows can be filtered, unfiltered, and/or conditioned in any known manner, either before or after mixing with the dedicated EGR flow from dedicated EGR system 21. The intake system may include components configured to facilitate or control introduction of the combined flow to engine 30, and may include an induction valve or throttle (not shown), one or more compressors 50, and charge air cooler 52. The induction valve may be connected upstream or downstream of compressor 50 via a fluid passage and configured to regulate a flow of atmospheric air and/or combined flow to engine 30. Compressor 50 may be a fixed or variable geometry compressor configured to receive air or combined flow from the induction valve and compress the air or combined flow to a predetermined pressure level before engine 30. Charge air cooler 52 may be disposed within inlet air supply conduit 23 between engine 30 and compressor 50, and embody, for example, an air-to-air heat exchanger, an air-to-liquid heat exchanger, or a combination of both to facilitate the transfer of thermal energy to or from the flow directed to engine 30.

In one embodiment, ambient air and/or combined flow is pressurized with compressor 50 and sent through charge air cooler 52 before delivery to mixing location 24. The EGR flow from dedicated EGR system 21 is distributed and mixed with inlet air at mixing location 24. The air-exhaust gas mixture is then supplied to engine 30 through intake manifold supply conduit 26 to engine intake manifold 28.

In certain embodiments, and as discussed further below with respect to FIGS. 2-6, the dedicated EGR cylinder(s) 30a and non-dedicated cylinders 30b-f include at least one of a port injector or a direct injector for delivering fuel to the combustion chamber thereof from a primary fuel source. In addition, dedicated EGR cylinder(s) 30a includes at least one second injector that is a port injector or direct injector for delivering fuel to its combustion chamber from a secondary fuel source. The fueling from the primary fuel source is controlled to provide an exhaust lambda value from the non-dedicated cylinder(s) 30b-30f that is around one, and a second fuel flow to the dedicated cylinder(s) 30a from the primary fuel source or a secondary fuel source is controlled to provide an exhaust lambda value from the dedicated cylinder(s) 30a that is less than one, or to provide some other desired operational outcome. For example, the exhaust output from the dedicated EGR cylinder(s) 30a can be controlled by the second fuel flow to produce hydrogen and carbon monoxide. When these constituents are present in dedicated EGR system 21, they are in turn provided to the intake of all cylinders 30a-30f to increase the combustion speed and reduce the production of pollutants during the combustion process in the non-dedicated cylinders 30b-30f.

A direct injector, as utilized herein, includes any fuel injection device that injects fuel directly into the cylinder volume, and is capable of delivering fuel into the cylinder volume when the intake valve(s) and exhaust valve(s) are closed. The direct injector may be structured to inject fuel at the top of the cylinder. In certain embodiments, the direct injector may be structured to inject fuel into a combustion pre-chamber. Each dedicated EGR cylinder 30a and non-dedicated cylinders 30b-f may include one or more direct injectors. The direct injectors may be the primary fueling device for the non-dedicated cylinders 30b-30f and dedicated EGR cylinder(s) 30a, or alternatively or additionally the direct injectors may be an auxiliary or secondary fueling device for the dedicated EGR cylinder(s) 30a.

A port injector, as utilized herein, includes any fuel injection device that injects fuel outside the engine cylinder in the intake manifold to form the air-fuel mixture. The port injector sprays the fuel towards the intake valve. During the intake stroke, the downwards moving piston draws in the air/fuel mixture past the open intake valve and into the combustion chamber. Each dedicated EGR cylinder 30a and non-dedicated cylinders 30b-f may include one or more port injectors. The port injectors may be the primary fueling device for the non-dedicated cylinders 30b-30f and dedicated EGR cylinder(s) 30a, or alternatively or additionally the port injectors may be an auxiliary or secondary fueling device for the dedicated EGR cylinder(s) 30a.

In certain embodiments, each cylinder 30a-30f includes one of a port or direct injector that is capable of providing all of the designed primary fueling amount for the cylinder 30a-30f at any operating condition. The dedicated cylinder(s) 30a includes at least one additional port or fuel injector to provide secondary fueling to the dedicated cylinder(s) 30a so that the exhaust output from the dedicated cylinder(s) 30a differs from the exhaust output of the non-dedicated cylinders 30b-f to achieve desired operational outcomes, such as improved efficiency, improved fuel economy, improved high load operation, and other outcomes.

Exhaust gas from the non-dedicated cylinders 30b-30f passes into an exhaust conduit 34 and through turbine 48. Exhaust gas from turbine 48 is outlet through an aftertreatment system (not shown) to a tail pipe or other structure to the atmosphere. The exhaust system along outlet conduit 68 may include components configured to treat exhaust from engine 30 before release to the atmosphere. Specifically, the exhaust system may include, for example, oxidation devices (DOC), particulate removing devices (DPF, CDPF), constituent absorbers or reducers (SCR, AMOX, LNT), three-way catalysts for stoichiometric spark ignited engines, attenuation devices (mufflers), controllers, etc., if desired.

In operation, engine 30 produces an exhaust gas stream from non-dedicated cylinders 30b-30f into exhaust conduit 34, an exhaust stream from dedicated cylinder(s) 30a into dedicated EGR system 21, and receives a charge flow from intake manifold supply conduit 26 comprising intake air and recirculated exhaust gas from dedicated EGR system 21. The engine 30 is fluidly coupled to intake manifold 28 and exhaust manifold 32, and the EGR stream passes from the one or more dedicated cylinder(s) 30a through EGR supply conduit 40. The dedicated EGR supply conduit 40 is illustrated as exiting the dedicated cylinder 30a, but may include one or more branch lines to receive exhaust from one or more of the other cylinders dedicated to providing EGR flow.

Figure 2:
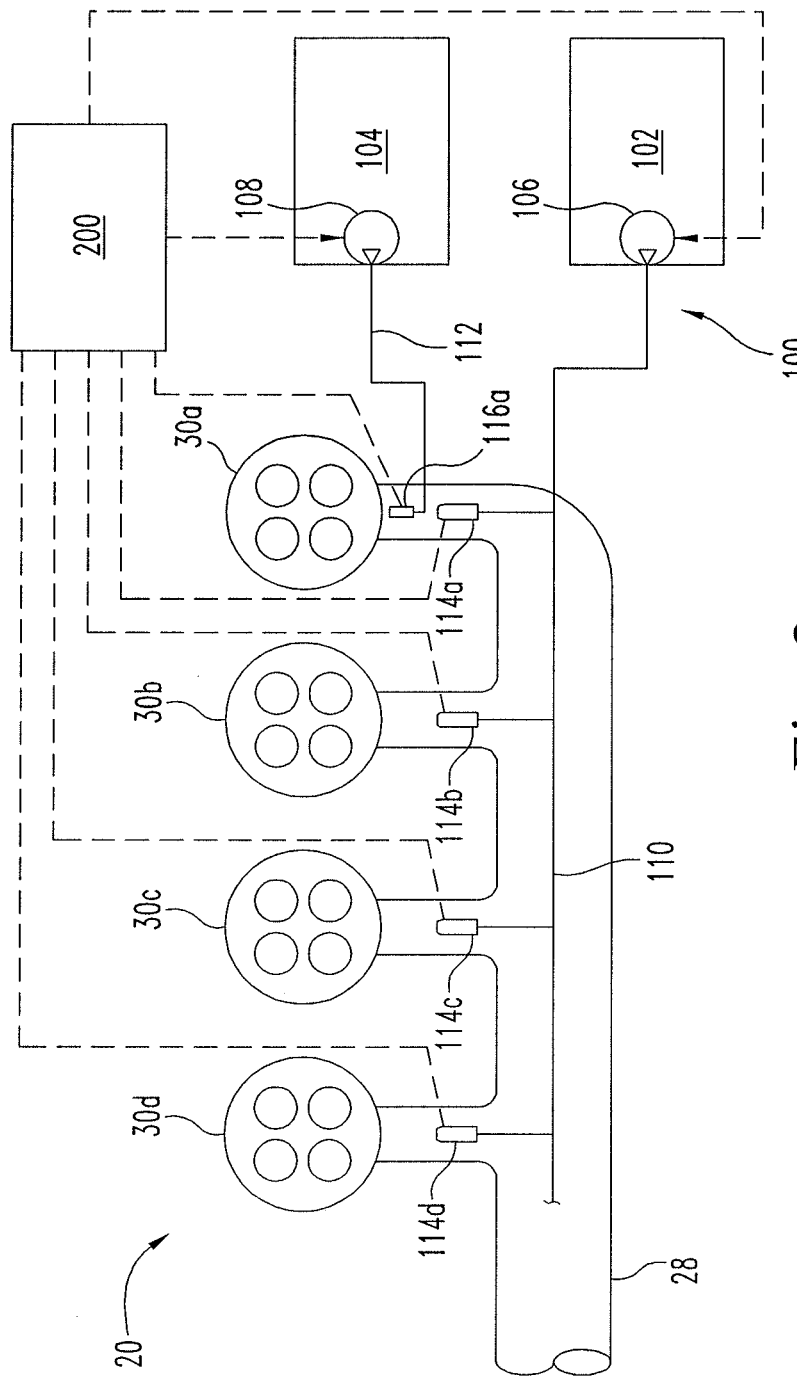
FIG. 2 is a schematic illustration of a portion of the internal combustion engine system of FIG. 1 showing one embodiment of a fueling system for the dedicated and non-dedicated cylinders.

With further reference to FIG. 2, one embodiment of system 20 is shown with a fuel system 100 that includes at least one fuel source to provide a primary fuel flow to all the cylinders 30a-30f and a second fuel flow to dedicated cylinder(s) 30a in addition to the primary fuel flow. Only cylinders 30a-30d are shown in FIGS. 2-6 for purposes of clarity, it being understood that any cylinder arrangement discussed herein is contemplated. Fueling system 100 includes a first fuel source 102 and a second fuel source 104. In one embodiment, first fuel source 102 is a primary fuel source that provides a flow of fuel to each of the cylinders 30a-30f, and second fuel source 104 is a secondary fuel source that provides a second flow of fuel only to dedicated EGR cylinder(s) 30a. The second flow of fuel changes the characteristics of the exhaust output of the dedicated cylinder(s) 30a to produce a desired operational outcome of cylinders 30a-30f using the recirculated exhaust gas from dedicated EGR system 21 of FIG. 1. In another embodiment, the first fuel source 102 is sole fuel source that is carbureted or fumigated and the dedicated cylinder(s) 30a have a second injector that is a direct injector or port injector.

First fuel source 102 includes a first fuel pump 106 that is connected to a controller 200, and the second fuel source 104 includes a second fuel pump 108 that is connected to controller 200. Each of the cylinders 30a-30f includes a port injector, such as port injectors 114a-114d associated with each of the illustrated cylinders 30a-30d of FIG. 2. Port injectors 114a-114d are electrically connected with controller 200 to receive fueling commands that provide a fuel flow to the respective cylinder in accordance with a fuel command determined according to engine operating conditions and operator demand by reference to fueling maps, control algorithms, or other fueling rate/amount determination source stored in controller 200. First fuel pump 106 is connected to each of the port injector 114a-114d with a first fuel line 110. First fuel pump 106 is operable to provide a first fuel flow from first fuel source 102 to each of the cylinders 30a-30d in an amount determined by controller 200 that achieves a desired power and exhaust output from the non-dedicated cylinders 30b-d. Furthermore, dedicated EGR cylinder 30a includes a second port injector 116a electrically connected with controller 200. Second fuel pump 108 is connected to second port injector 116a with a second fuel line 112. Second fuel pump 108 is operable to provide a second fuel flow from second fuel source 104 in an amount determined by controller 200 that achieves a desired power and exhaust output from dedicated cylinder 30a.

In one embodiment, the first fuel source 102 is gasoline and the second fuel source 104 is a gasoline and ethanol alcohol blend, such as E85. Gasoline provides high energy density to achieve high performance and fuel economy when combusted by all the cylinders 30a-30f. The E85 fuel provides a lower density fuel that can be added to the gasoline flow to dedicated EGR cylinder 30a to achieve an exhaust output that includes hydrogen and carbon monoxide which is re-circulated to each of the cylinders 30a-30f by the dedicated EGR system 21. These species in the recirculated exhaust gas improves the combustion speed and reduces knock, while maintaining fuel economy and high load performance of the high energy density fuel and minimizing fuel economy impact from fueling with a lower energy density fuel.

Figure 3:
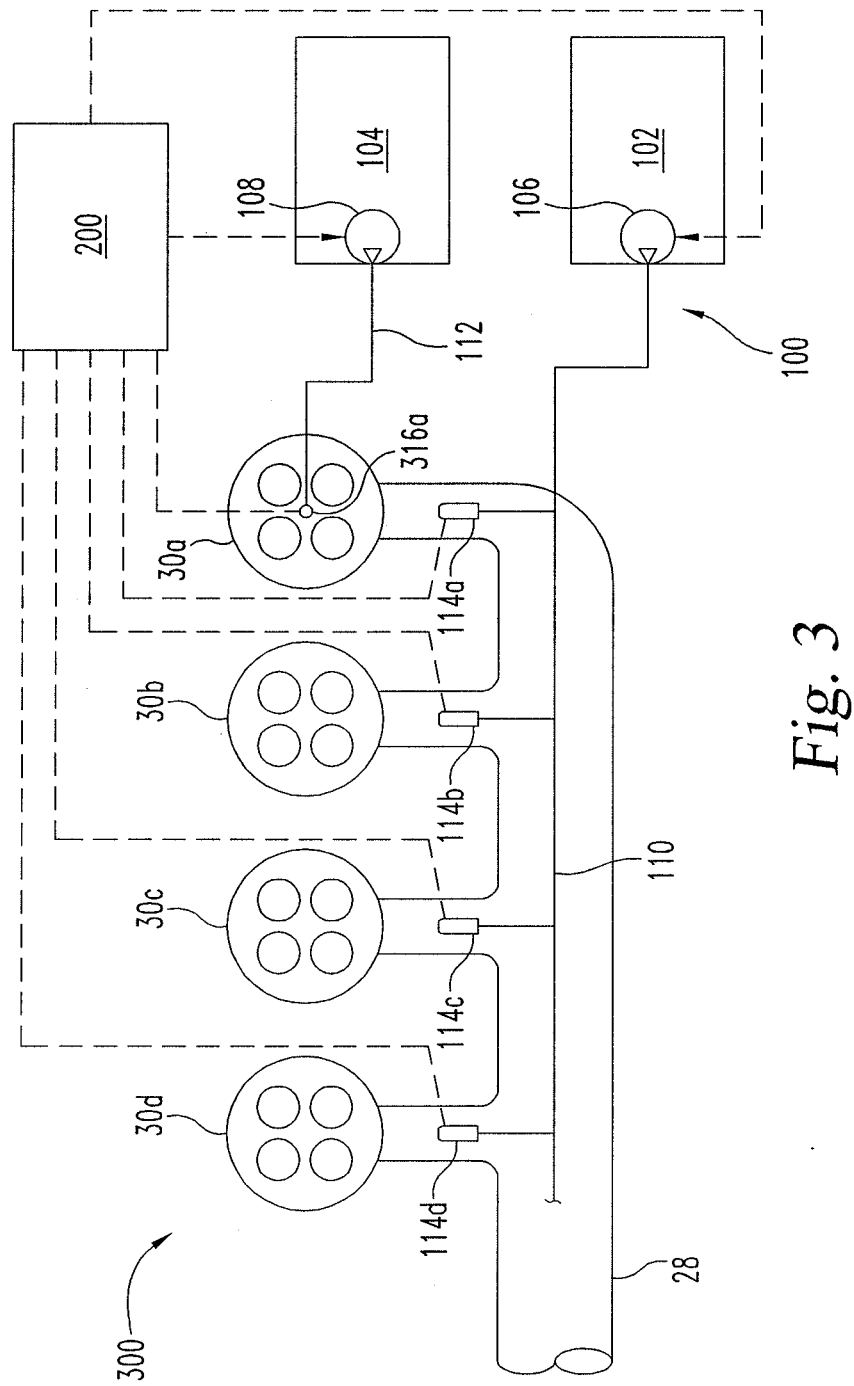
FIG. 3 is a schematic illustration of a portion of the internal combustion engine system of FIG. 1 showing another embodiment of a fueling system for the dedicated and non-dedicated cylinders.

In another embodiment of system 20 illustrated in FIG. 3, a system 300 is shown in which like components with system 20 are designated with the same reference numerals used previously herein. In system 300, dedicated EGR cylinder 30a includes a second injector in the form of a direct injector 316a electrically connected with controller 200. Second fuel pump 108 is connected to direct injector 316a with second fuel line 112. Second fuel pump 108 is operable to provide a second fuel flow from second fuel source 104 through direct injector 316a, in addition to the first fuel flow from first fuel source 102 through port injector 114a, in an amount determined by controller 200 that achieves a desired power and exhaust output from dedicated cylinder 30a.

Figure 4:
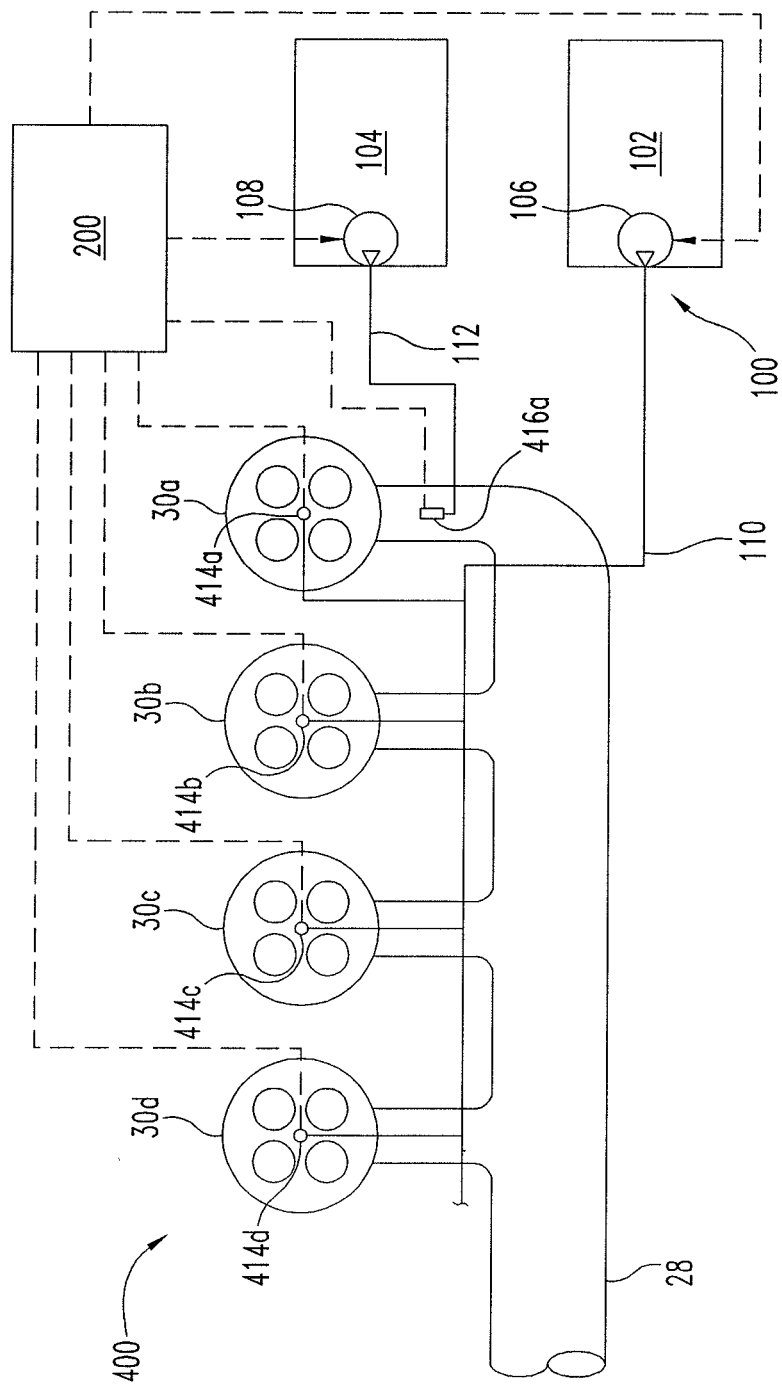
FIG. 4 is a schematic illustration of a portion of the internal combustion engine system of FIG. 1 showing another embodiment of a fueling system for the dedicated and non-dedicated cylinders.

In another embodiment of system 20 illustrated in FIG. 4, a system 400 is shown in which like components are designated with the same reference numerals used previously herein. In system 400, each of the cylinders 30a-30f includes a direct injector, such as direct injectors 414a-414d associated with each of the illustrated cylinders 30a-30d of FIG. 4. Direct injectors 414a-414d are electrically connected with controller 200. First fuel pump 106 is connected to each of the direct injectors 414a-414d with first fuel line 110. First fuel pump 106 is operable to provide a first fuel flow from first fuel source 102 through each of the direct injectors 414a-414d to each of the cylinders 30a-30d in an amount determined by controller 200 that achieves a desired exhaust output from the non-dedicated cylinders 30b-d. Dedicated EGR cylinder 30a includes a second injector in the form of a port injector 416a electrically connected with controller 200. Second fuel pump 108 is connected to port injector 416a with second fuel line 112. Second fuel pump 108 is operable to provide a second fuel flow from second fuel source 104 through port injector 416a, in addition to the first fuel flow from first fuel source 102 through direct injector 414a, in an amount determined by controller 200 that achieves a desired power and exhaust output from dedicated cylinder 30a.

Figure 5:
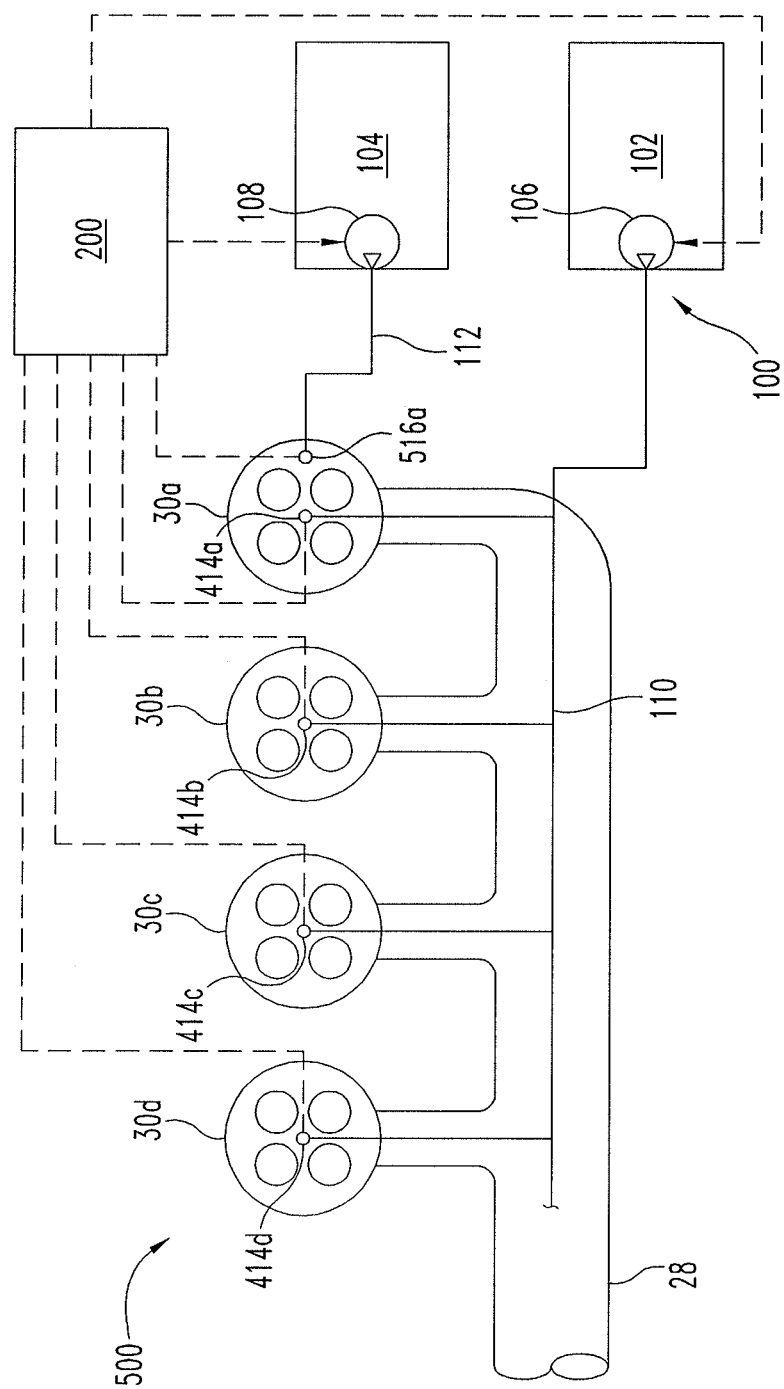
FIG. 5 is a schematic illustration of a portion of the internal combustion engine system of FIG. 1 showing another embodiment of a fueling system for the dedicated and non-dedicated cylinders.

In another embodiment of system 20 illustrated in FIG. 5, a system 500 which is similar to system 400 is shown, and in which like components are designated with the same reference numerals used previously herein. In system 500, dedicated EGR cylinder 30a includes a second direct injector 516a electrically connected with controller 200. Second fuel pump 108 is connected to direct injector 516a with second fuel line 112. Second fuel pump 108 is operable to provide a second fuel flow from second fuel source 104 through direct injector 516a, in addition to the first fuel flow from first fuel source 102 through direct injector 414a, in an amount determined by controller 200 that achieves a desired power and exhaust output from dedicated cylinder 30a. In this embodiment, direct injector 414a can be center mounted on each dedicated cylinder(s) 30a and direct injector 516a can be laterally mounted on each dedicated cylinder(s) 30a. Alternatively, direct injector 414a can be laterally mounted and directed injector 516a can be center mounted.

The various embodiments disclosed herein contemplate various fuels for first fuel source 102, including, but not limited to, gasoline, a gasoline and ethanol alcohol mix such as E85, and natural gas. The second fuel source 104 can include, but is not limited to, gasoline, natural gas, methane, and an ammonia source. As used herein, ammonia source includes any source of ammonia including aqueous mixtures including an ammonia source, such as urea and water, diesel exhaust fluid, or ammonia surrogate. Except as discussed below with respect to FIG. 6, the second fuel source is different than the first fuel source.

Figure 6:
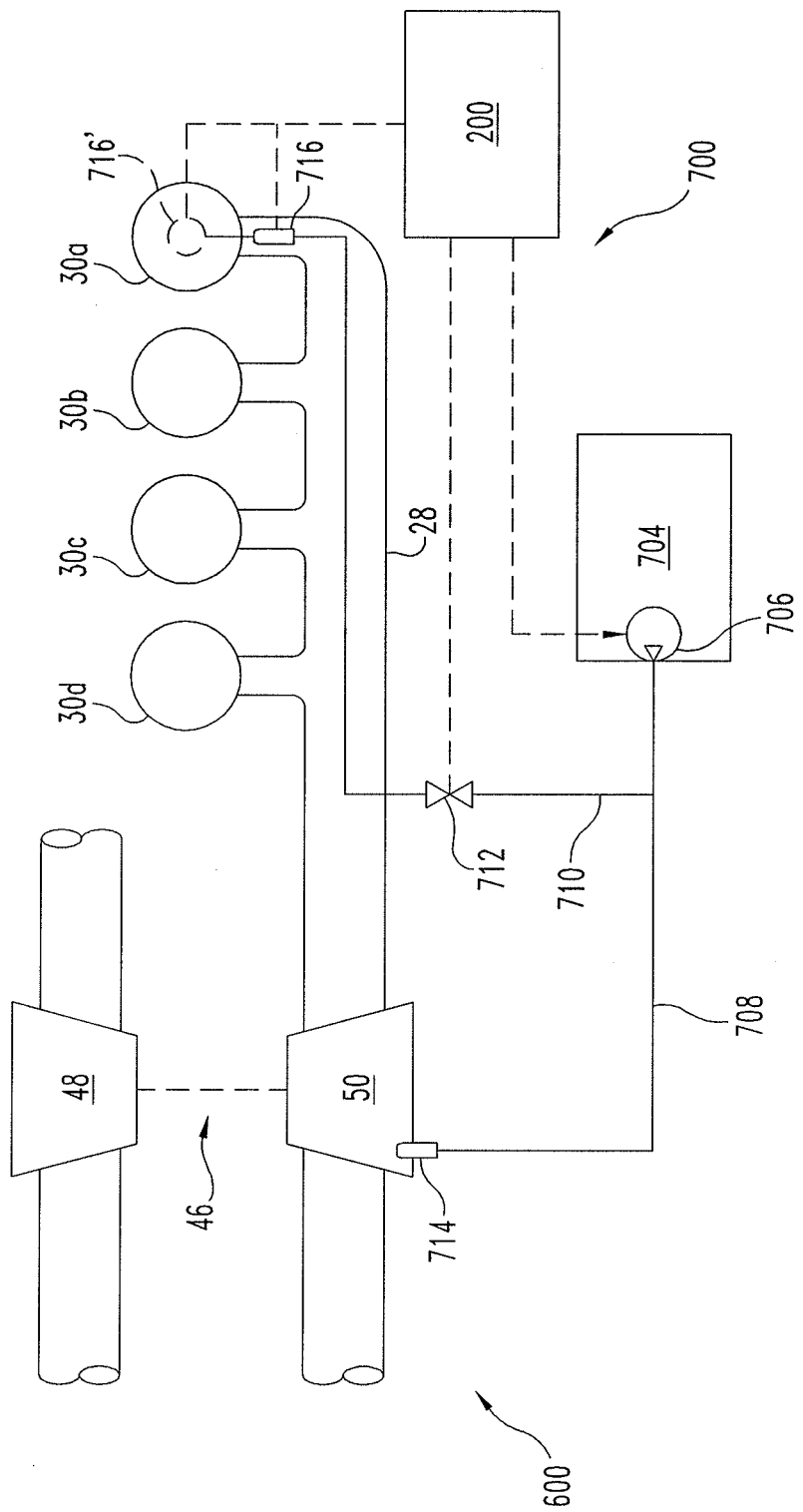
FIG. 6 is a schematic illustration of a portion of the internal combustion engine system of FIG. 1 showing another embodiment of a fueling system for the dedicated and non-dedicated cylinders.

In another embodiment of system 20 illustrated in FIG. 6, a system 600 is shown in which like components with system 20 are designated with the same reference numerals used previously herein. System 600 includes a fuel system 700 with a single fuel source 704 having a fuel pump 706 electrically connected with controller 200. Fuel source 704 stores a fuel that is delivered to cylinders 30a-30d with a fuel pump 706. Alternatively, the first fuel source can be pressurized and no fuel pump is required for providing the first fuel flows In the illustrated embodiment, fuel pump 706 is connected to a first injector 714 located at an inlet to compressor 50 of turbocharger system 46 with a first fuel line 708.

Fuel pump 706 is further connected with a second injector 716 at each of the dedicated cylinder(s) 30a with a second fuel line 710. In another alternative embodiment, the fuel source is pressurized to provide the second fuel flow without a fuel pump, In another embodiment, a fuel pump 706 is only provided for the second fuel flow and the first fuel flow is provided by a pressurized fuel source. Second injector 716 can be a port injector as shown, as a direct injector as indicated by 716'. A control valve 712 can be provided in fuel line 710 and/or at one or more other locations in fuel system 700 that is connected to controller 200. Alternatively, a second fuel pump can be provided and connected to second injector 716 with a separate fuel line. The control valve(s) 712, fuel pump 706, and/or injectors 714, 716 can be operable to regulate the amount of the first flow of fuel to all cylinders 30a-30f and to the dedicated cylinder(s) 30a to provide the desired power and exhaust output. In one embodiment, the single fuel source 704 is natural gas and injectors 714, 716 are natural gas injectors.

In the embodiment of FIG. 6, the fuel source provides the same fuel source for the first and second fuel flows, and the first fuel flow can be fumigated or carbureted. Existing engines employing such a fueling system can be converted to provide dedicated exhaust gas recirculation by providing a port injector or direct injector on the dedicated cylinder(s) 30a. One example of such engine suitable for a conversion of this type is an engine using natural gas a fuel source for the first and second fuel flows.

In certain embodiments of the systems disclosed herein, controller 200 is structured to perform certain operations to control engine operations and fueling of cylinders 30a-30f with fueling system 100, 700 to provide the desired exhaust output from the non-dedicated cylinders 30b-30f and the dedicated cylinder(s) 30a. In certain embodiments, the controller 200 forms a portion of a processing subsystem including one or more computing devices having memory, processing, and communication hardware. The controller 200 may be a single device or a distributed device, and the functions of the controller 200 may be performed by hardware or software. The controller 200 may be included within, partially included within, or completely separated from an engine controller (not shown). The controller 200 is in communication with any sensor or actuator throughout the systems disclosed herein, including through direct communication, communication over a datalink, and/or through communication with other controllers or portions of the processing subsystem that provide sensor and/or actuator information to the controller 200.

Certain operations described herein include operations to interpret one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

The schematic flow description which follows provides an illustrative embodiment of performing procedures for providing compositional feedback control of a dedicated EGR system in combination with a multi-fuel flow to the dedicated EGR cylinders 30(a) such as is provided with fuel system 100 or fuel system 700. As used herein, a multi-fuel flow system is a fueling system in which each of the cylinders 30a-30f receives a first fuel flow and the dedicated cylinder(s) 30a receive an additional, second fuel flow. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product comprises instructions causing the computer to execute one or more of the operations, or to issue commands to other devices to execute one or more of the operations.

Figure 7:
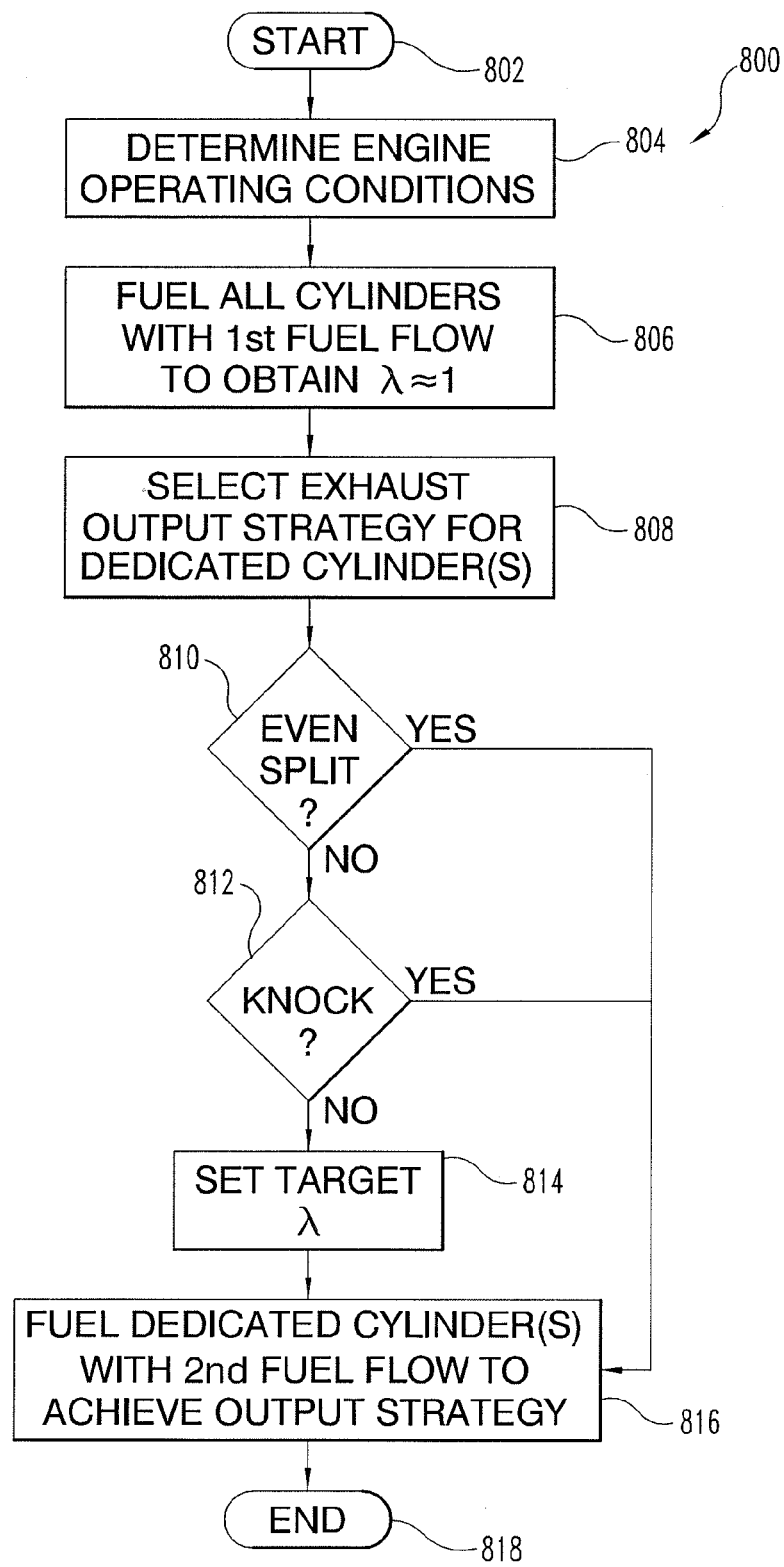
FIG. 7 is a flow diagram of a flow procedure for fueling the plurality of cylinders of the systems of FIGS. 1-6.

In FIG. 7, one embodiment of a flow diagram for operating engine 30 with a dedicated EGR system 21 and a fueling system 100, 700 is disclosed. Procedure 800 starts at 802 upon, for example, starting of engine 30. At operation 804 the operating conditions of engine 30, including the fueling provided thereto and the exhaust produced thereby, are determined. The operating conditions of engine 30 can indicate, for example, a cold start condition, a warm-up condition, a high load condition, or other condition in which fueling of cylinders 30a-30f may be controlled to provide a desired operational outcome, such as mitigating emissions of pollutants or meeting certain performance requirements over a period of time. These operating conditions, among other factors such as fuel type, engine speed, engine load, etc., are used at operation 806 to determine a fueling rate to each of the cylinders 30a-30f from the at least one fuel source to obtain a lambda value of about 1 in the exhaust output from the non-dedicated cylinders 30b-30f. A lambda value of 1 represents the ideal stoichiometric ratio of air to fuel in the intake charge flow to the cylinders 30a-30f to completely burn the fuel.

Procedure 800 continues at operation 808 in which a desired exhaust output strategy for the dedicated EGR cylinder(s) 30a is selected. Since dedicated cylinder(s) 30a receive a second flow of fuel from the same or different source of fuel used to fuel all cylinders 30a-30f at operation 806, the exhaust output in the dedicated EGR system 21 can be manipulated to achieve a desired operational outcome by providing characteristics to the exhaust in the dedicated EGR flow that is received by all cylinders 30a-30f. For example, one output strategy of procedure 800 includes determining at conditional 810 whether to evenly split the total fuel flow to the dedicated EGR cylinder 30(a) between the first fuel flow and the second fuel flow. If an even split is not desired, procedure 800 continues at conditional 812 where it is determined whether control of a knock condition in the dedicated EGR cylinders 30(a) should be employed to determine the second fuel flow. If conditional 810 or conditional 812 are affirmative, procedure 800 continues at operation 816 in which the fueling rate for the second fuel flow to the dedicated EGR cylinder(s) 30a is determined to satisfy the desired operational outcome.

If conditional 810 and conditional 812 are negative, procedure 800 continues at operation 814 in which a lambda value for the exhaust output from the dedicated EGR cylinder(s) 30a is determined based on operating conditions. In one embodiment, the lambda value for the dedicated cylinder(s) 30a is set to be less than one at operation 814 to provide a rich fueling condition to the dedicated cylinder(s) 30a, which increases the beneficial presence of Hydrogen and CO in the recirculated exhaust gas. Procedure 800 continues at operation 816 the second fuel flow that achieves the target lambda value is determined and the dedicated EGR cylinder(s) 30a are fueled accordingly. In other embodiments of procedure 800, one or more of conditionals 810 and 812 are omitted, and the second fuel flow is determined solely by the target lambda value to be achieved. Procedure 800 ends at operation 818 when, for example, engine operation is terminated.

In certain embodiments of procedure 800, operation 814 includes an operation to interpret a lambda value amount to be produced by dedicated EGR cylinder(s) 30a, and to determine a fuel amount for the dedicated EGR cylinder(s) 30a in response to the lambda value. The procedure 800 can further include an operation 816 to fuel the dedicated EGR cylinder(s) 30a in response to the determined fuel amount. The fueling of the plurality of cylinders 30a-30f and the dedicated EGR cylinder(s) 30a in response to the determined fuel amount includes, without limitation, fueling the cylinders with the fuel amount required to achieve a desired lambda value, progressing acceptably toward the fuel amount required to achieve the lambda value, and/or fueling with an amount otherwise limited such as by oxygen-fuel limits, torque production limits, engine vibration limits, intake manifold or EGR system temperature limits, knock reduction limits, etc. Example operations to interpret the lambda value include, without limitation, interpreting a lambda value in an exhaust stream of an internal combustion engine from the non-dedicated cylinders 30b-30f and from the dedicated EGR cylinder(s) 30a using any known method, sensor or combination of sensors in the exhaust for determining air to fuel ratio in the cylinders 30a-30f.

Various aspects of the systems and methods disclosed herein are contemplated. For example, one aspect relates to a method that includes operating an internal combustion engine. The engine includes a plurality of cylinders, at least one fuel source that is connected to the plurality of cylinders, an exhaust system, and an intake system. At least one of the plurality of cylinders is a dedicated cylinder operably connected to provide exhaust flow to a dedicated exhaust gas recirculation system, and a remaining portion of the plurality of cylinders are operably connected to provide exhaust flow to the exhaust system. The method includes providing a first fuel flow from the at least one fuel source to each of the plurality of cylinders through the first fueling system and providing a second fuel flow from the at least one fuel source to each dedicated cylinder through the second fueling system while providing the first fuel flow to each of the plurality of cylinders through the first fueling system.

According to another aspect, a method includes providing an internal combustion engine operable to produce a flow of exhaust from a plurality of cylinders into an exhaust system of the internal combustion engine; configuring the exhaust system to direct a first portion of the flow of exhaust to a dedicated exhaust gas recirculation system to mix with an intake flow to the plurality of cylinders for combustion by the plurality of cylinders. The exhaust system is configured so that the first portion of the flow of exhaust is created by combustion in at least one dedicated cylinder of the plurality of cylinders. The method further includes configuring the exhaust system to direct a remaining portion of the flow of exhaust to an exhaust outlet from the remaining portion of the plurality of cylinders that are not dedicated to exhaust gas recirculation. The method also includes connecting at least one fuel source to each of the plurality of cylinders to provide a first flow of fuel to each of the plurality of cylinders from the at least one fuel source and connecting the at least one source of fuel to each dedicated cylinder to provide a second flow of fuel of fuel to each dedicated cylinder from the at least one fuel source that is in addition to the first flow of fuel.

According to one embodiment of the methods disclosed herein, the at least one fuel source is a single fuel source. In a refinement of this embodiment, the single fuel source is natural gas and the first fuel flow is provided through a fuel injector at an inlet to a compressor of the intake system and the second fuel flow is provided through a fuel injector located at each dedicated cylinder. In another embodiment, the second fuel flow is provided through a mixer located upstream or downstream of the compressor.

According to another embodiment, the plurality of cylinders are operated to combust the first fuel flow to obtain an exhaust output having a lambda value of about 1 from the remaining portion of the plurality of cylinders, and each dedicated cylinder is operated to combust the first fuel flow and the second fuel flow to obtain an exhaust output having a lambda value of less than 1.

In another embodiment, the at least one fuel source includes a first fuel source of gasoline and a second fuel source of E85. In one refinement of this embodiment, the first fuel source is connected to a first port injector at each of the plurality of cylinders and the second fuel source is connected to a second port injector at each dedicated cylinder. In another refinement of this embodiment, the first fuel source is connected to a port injector at each of the plurality of cylinders and the second fuel source is connected to a direct injector at each dedicated cylinder. The second fuel flow can be controlled as a function of knock in each dedicated cylinder. In another refinement of this embodiment, the first fuel source is connected to a direct injector at each of the plurality of cylinders and the second fuel source is connected to a port fuel injector at each dedicated cylinder. In yet another refinement of this embodiment, the first fuel source is connected to a first direct injector at each of the plurality of cylinders and the second fuel source is connected to a second direct injector at each dedicated cylinder.

In another embodiment of the method, the at least one fuel source includes a first fuel source of E85 and a second fuel source of gasoline. In a refinement of this embodiment, the first fuel source is connected to a direct injector at each of the plurality of cylinders and the second fuel source is connected to a port fuel injector at each dedicated cylinder.

In another embodiment of the method, the at least one fuel source includes a first fuel source providing the first fuel flow with a first fuel to the plurality of cylinders so that the exhaust output from combustion of the first fuel in the remaining portion of the plurality of cylinders that has a lambda value of about 1. In a refinement of this embodiment, the at least one fuel source includes a second fuel source providing the second fuel flow to each dedicated cylinder so that the exhaust output from combustion of the first and second fuels in each dedicated cylinder has a lambda value that is less than one. In another refinement of this embodiment, the at least one fuel source includes a second fuel source providing the second fuel flow to each dedicated cylinder and the first fuel flow and the second fuel flow are provided to each dedicated cylinder during an intake stroke of each dedicated cylinder. In yet another refinement of this embodiment, the at least one fuel source includes a second fuel source providing the second fuel flow to each dedicated cylinder and the first fuel flow is provided to each dedicated cylinder during an intake stroke of each dedicated cylinder and the second fuel flow is provided to each dedicated cylinder during a power or exhaust stroke of after combustion has been initiated in each dedicated cylinder. In a further refinement, the at least one fuel source includes a second fuel source providing the second fuel flow to each dedicated cylinder and the first fuel flow and the second fuel flow are provided in equal amounts to each dedicated cylinder.

According to another embodiment of the method, the at least one fuel source includes a first fuel source and a second fuel source. The first fuel source includes a fuel selected from the group consisting of gasoline, E85, and natural gas; and the second fuel source includes a fuel selected from the group consisting of gasoline, E85, natural gas, methane, and an ammonia source. In a refinement of this embodiment, the fuel of the first fuel source and the fuel of the second fuel source are different fuels.

According to another aspect, a system is disclosed that includes an engine having a plurality of cylinders, an intake system configured to direct a charge flow to all of the plurality of cylinders, an exhaust system configured to receive exhaust from a first portion of the plurality of cylinders and outlet the exhaust to atmosphere, a dedicated exhaust gas recirculation system configured to receive exhaust from a second portion of the plurality of cylinders and direct the exhaust from the second portion of the plurality of cylinders to the intake system, and a fuel system including at least one fuel source that is connected to each of the plurality of cylinders to provide a first fuel flow, the at least one fuel source further being connected to the second portion of the plurality of cylinders to provide a second fuel flow in addition to the first fuel flow.

In one embodiment of the system, the second portion of the plurality of cylinders is dedicated entirely to providing exhaust for recirculation to the intake system. In another embodiment, the system includes a turbocharger system including a turbine connected to the first portion of the plurality of cylinders to receive exhaust therefrom. In a refinement of this embodiment, the at least one fuel source is a single fuel source of natural gas, the single fuel source is connected to a first fuel injector at an inlet to a compressor of the turbocharger system, the first fuel injector provides the first fuel flow, the single fuel source is further connected to a second fuel injector at each of the second portion of the plurality of cylinders, and the second fuel injector provides the second fuel flow.

In another embodiment of the system, the at least one fuel source includes a first fuel source connected to each of the plurality of cylinders and a second fuel source connected only to each of the second portion of the plurality of cylinders. In a refinement of this embodiment, each of the plurality cylinders includes a port injector and each of the second portion of the plurality of cylinders further includes a second port injector. In another refinement of this embodiment, each of the plurality cylinders includes a port injector and each of the second portion of the plurality of cylinders further includes a direct injector. In yet another refinement of this embodiment, each of the plurality cylinders includes a direct injector and each of the second portion of the plurality of cylinders further includes a port injector. In another refinement of this embodiment, each of the plurality cylinders includes a direct injector and each of the second portion of the plurality of cylinders further includes a second direct injector.

In another embodiment, the system includes a first fuel source and a second fuel source. The first fuel source includes a fuel selected from the group consisting of gasoline, E85, and natural gas; and the second fuel source includes a fuel selected from the group consisting of gasoline, E85, natural gas, methane, and an ammonia source. In a refinement of this embodiment, the fuel of the first fuel source and the fuel of the second fuel source are different fuels.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
operating an internal combustion engine including a plurality of cylinders, at least one fuel source that is connected to the plurality of cylinders, an exhaust system, and an intake system, at least one of the plurality of cylinders being a dedicated cylinder operably connected to provide exhaust flow to a dedicated exhaust gas recirculation system and a remaining portion of the plurality of cylinders being operably connected to provide exhaust flow to the exhaust system;
providing a first fuel flow from the at least one fuel source to each of the plurality of cylinders; and
providing a second fuel flow from the at least one fuel source to each dedicated cylinder while providing the first fuel flow to each of the plurality of cylinders.

2. The method of claim 1, wherein the at least one fuel source is a single fuel source.

3. The method of claim 2, wherein the single fuel source is natural gas and the first fuel flow is provided through one of a first fuel injector and a mixer located at an inlet to a compressor of the intake system and the second fuel flow is provided through a second fuel injector located at each dedicated cylinder.

4. The method of claim 2, wherein the single fuel source is natural gas and the first fuel flow is provided through one of a first fuel injector and a mixer located at an outlet of a compressor of the intake system and the second fuel flow is provided through a second fuel injector located at each dedicated cylinder.

5. The method of claim 1, wherein the plurality of cylinders are operated to combust the first fuel flow to obtain an exhaust output having a lambda value of about 1 from the remaining portion of the plurality of cylinders and each dedicated cylinder is operated to combust the first fuel flow and the second fuel flow to obtain an exhaust output having a lambda value of less than 1.

6. The method of claim 1, wherein the at least one fuel source includes a first fuel source of gasoline and a second fuel source of E85.

7. The method of claim 6, wherein the first fuel source is connected with a first port injector at each of the plurality of cylinders and the second fuel source is connected with a second port injector at each dedicated cylinder.

8. The method of claim 6, wherein the first fuel source is connected with a port injector at each of the plurality of cylinders and the second fuel source is connected with a direct injector at each dedicated cylinder.

9. The method of claim 8, wherein the second fuel flow is controlled as a function of knock in each dedicated cylinder.

10. The method of claim 6, wherein the first fuel source is connected with a direct injector at each of the plurality of cylinders and the second fuel source is connected with a port fuel injector at each dedicated cylinder.

11. The method of claim 6, wherein the first fuel source is connected with a first direct injector at each of the plurality of cylinders and the second fuel source is connected with a second direct injector at each dedicated cylinder.

12. The method of claim 1, wherein the at least one fuel source includes a first fuel source of E85 and a second fuel source of gasoline.

13. The method of claim 12, wherein the first fuel source is connected with a direct injector at each of the plurality of cylinders and the second fuel source is connected with a port fuel injector at each dedicated cylinder.

14. The method of claim 1, wherein the at least one fuel source includes a first fuel source providing the first fuel flow with a first fuel to the plurality of cylinders so that the exhaust output from combustion of the first fuel in the remaining portion of the plurality of cylinders that has a lambda value of about 1.

15. The method of claim 14, wherein the at least one fuel source includes a second fuel source providing the second fuel flow to each dedicated cylinder so that the exhaust output from combustion of the first and second fuels in each dedicated cylinder has a lambda value that is less than one.

16. The method of claim 14, wherein the at least one fuel source includes a second fuel source providing the second fuel flow to each dedicated cylinder and the first fuel flow and the second fuel flow are provided to each dedicated cylinder during an intake stroke of each dedicated cylinder.

17. The method of claim 14, wherein the at least one fuel source includes a second fuel source providing the second fuel flow to each dedicated cylinder and the first fuel flow is provided to each dedicated cylinder during an intake stroke of each dedicated cylinder and the second fuel flow is provided to each dedicated cylinder during an exhaust or power stroke after combustion has been initiated in each dedicated cylinder.

18. The method of claim 14, wherein the at least one fuel source includes a second fuel source providing the second fuel flow to each dedicated cylinder and the first fuel flow and the second fuel flow are provided in equal amounts to each dedicated cylinder.

19. The method of claim 1, wherein:
the at least one fuel source includes a first fuel source and a second fuel source;
the first fuel source includes a fuel selected from the group consisting of gasoline, E85, and natural gas; and
the second fuel source includes a fuel selected from the group consisting of gasoline, E85, natural gas, methane, and an ammonia source.

20. The method of claim 19, wherein the fuel of the first fuel source and the fuel of the second fuel source are different fuels.

21. A method, comprising:
providing an internal combustion engine operable to produce a flow of exhaust from a plurality of cylinders into an exhaust system of the internal combustion engine;
configuring the exhaust system to direct a first portion of the flow of exhaust to a dedicated exhaust gas recirculation system to mix with an intake flow to the plurality of cylinders for combustion by the plurality of cylinders, wherein the exhaust system is configured so that the first portion of the flow of exhaust is created by combustion in at least one dedicated cylinder of the plurality of cylinders;
configuring the exhaust system to direct a remaining portion of the flow of exhaust to an exhaust outlet, wherein the remaining portion of the flow of exhaust is created by combustion in a remaining portion of the plurality of cylinders that are not dedicated to exhaust gas recirculation;
connecting at least one fuel source to each of the plurality of cylinders to provide a first flow of fuel to each of the plurality of cylinders from the at least one fuel source; and
connecting the at least one source of fuel to each dedicated cylinder to provide a second flow of fuel to each dedicated cylinder from the at least one fuel source that is in addition to the first flow of fuel.

22. The method of claim 21, wherein:
the at least one fuel source is a single fuel source of natural gas;
the single fuel source is connected to one of a first fuel injector, and a mixer at an inlet to a compressor that receives the intake flow;
the first fuel injector provides the first flow of fuel;
the single fuel source is connected to a second fuel injector at each of the dedicated cylinders; and
the second fuel injector provides the second flow of fuel.

23. The method of claim 21, wherein connecting the at least one fuel source includes connecting a first fuel source to each of plurality of cylinders and connecting a second fuel source only to each of the dedicated cylinders.

24. The method of claim 23, wherein each of the plurality of cylinders includes a port injector and each of the dedicated cylinders further includes a second port injector.

25. The method of claim 23, wherein each of the plurality cylinders includes a port injector and each of the dedicated cylinders further includes a direct injector.

26. The method of claim 23, wherein each of the plurality cylinders includes a direct injector and each of the dedicated cylinders further includes a port injector.

27. The method of claim 23, wherein each of the plurality cylinders includes a direct injector and each of the dedicated cylinders includes a second direct injector in addition to the direct injector.

28. The method of claim 23, wherein:
the at least one fuel source includes a first fuel source and a second fuel source;
the first fuel source includes a fuel selected from the group consisting of gasoline, E85, and natural gas; and
the second fuel source includes a fuel selected from the group consisting of gasoline, E85, natural gas, methane, and an ammonia source.

29. The method of claim 28, wherein the fuel of the first fuel source and the fuel of the second fuel source are different fuels.

30. A system, comprising:
an engine including a plurality of cylinders;
an intake system configured to direct a charge flow to all of the plurality of cylinders;
an exhaust system configured to receive exhaust from a first portion of the plurality of cylinders and outlet the exhaust to atmosphere;
a dedicated exhaust gas recirculation system configured to receive exhaust from a second portion of the plurality of cylinders and direct the exhaust from the second portion of the plurality of cylinders to the intake system; and
a fuel system including at least one fuel source that is connected to each of the plurality of cylinders to provide a first fuel flow, the at least one fuel source further being connected to the second portion of the plurality of cylinders to provide a second fuel flow in addition to the first fuel flow.

31. The system of claim 30, wherein the second portion of the plurality of cylinders is dedicated entirely to providing exhaust for recirculation to the intake system.

32. The system of claim 30, further comprising a turbocharger system including a turbine connected to the first portion of the plurality of cylinders to receive exhaust therefrom.

33. The system of claim 32, wherein:
the at least one fuel source is a single fuel source of natural gas;
the single fuel source is connected to one of a first fuel injector and a mixer at an inlet to a compressor of the turbocharger system;
the first fuel injector provides the first fuel flow;
the single fuel source is further connected to a second fuel injector at each of the second portion of the plurality of cylinders; and
the second fuel injector provides the second fuel flow.

34. The system of claim 30, wherein the at least one fuel source includes a first fuel source connected to each of the plurality of cylinders and a second fuel source connected only to each of the second portion of the plurality of cylinders.

35. The system of claim 34, wherein each of the plurality cylinders includes a port injector and each of the second portion of the plurality of cylinders further includes a second port injector.

36. The system of claim 34, wherein each of the plurality cylinders includes a port injector and each of the second portion of the plurality of cylinders further includes a direct injector.

37. The system of claim 34, wherein each of the plurality cylinders includes a direct injector and each of the second portion of the plurality of cylinders further includes a port injector.

38. The system of claim 34, wherein each of the plurality cylinders includes a direct injector and each of the second portion of the plurality of cylinders further includes a second direct injector.

39. The system of claim 30, wherein:
- the at least one fuel source includes a first fuel source and a second fuel source;
- the first fuel source includes a fuel selected from the group consisting of gasoline, E85, and natural gas; and
- the second fuel source includes a fuel selected from the group consisting of gasoline, E85, natural gas, methane, and an ammonia source.

40. The system of claim 39, wherein the fuel of the first fuel source and the fuel of the second fuel source are different fuels.

\* \* \* \* \*